July 31, 1923. 1,463,679

E. DE LEON

AUTOMATIC TRAIN STOP

Filed July 3, 1922     2 Sheets-Sheet 1

July 31, 1923.

E. DE LEON 1,463,679

AUTOMATIC TRAIN STOP

Filed July 3, 1922

WITNESSES
H. T. Walker

INVENTOR
Emilio de Leon
BY Munn & Co.
ATTORNEYS

Patented July 31, 1923.

1,463,679

UNITED STATES PATENT OFFICE.

EMILIO DE LEON, OF REMEDIOS, CUBA.

AUTOMATIC TRAIN STOP.

Application filed July 3, 1922. Serial No. 572,416.

*To all whom it may concern:*

Be it known that I, EMILIO DE LEON, a citizen of Cuba, and a resident of Remedios, Cuba, have invented a new and Improved Automatic Train Stop, of which the following is a description.

My invention relates to train stops and particularly to a train stop that will be brought into action automatically should the track rails spread or a rail become broken or displaced permitting the truck to drop to the roadbed.

The general object of my invention is to provide an automatic train stop controlled by truck movements, a more specific object being to provide an automatic train stop that will be sensitively responsive to the dropping of the front wheels of the truck to dispose the truck in an oblique position in the absence of a rail in proper place, the movement of the truck to the oblique position from a normal position on the track rails serving to actuate valve opening means whereby to release the air in the train pipe for applying the brakes.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 3 is a view similar to Figure 2 indicating the position of the truck and the stop operating means when the truck assumes an oblique position due to broken or spread rails or the like;

Figure 5 is a longitudinal vertical section of the air valve and the valve opening means, the section being indicated by the line 5—5, Figure 6;

Figure 6 is a transverse vertical section as indicated by the line 6—6, Figure 5;

Figure 7 is a view similar to Figure 4 but illustrating a slight modification of the operating means.

Figure 1:
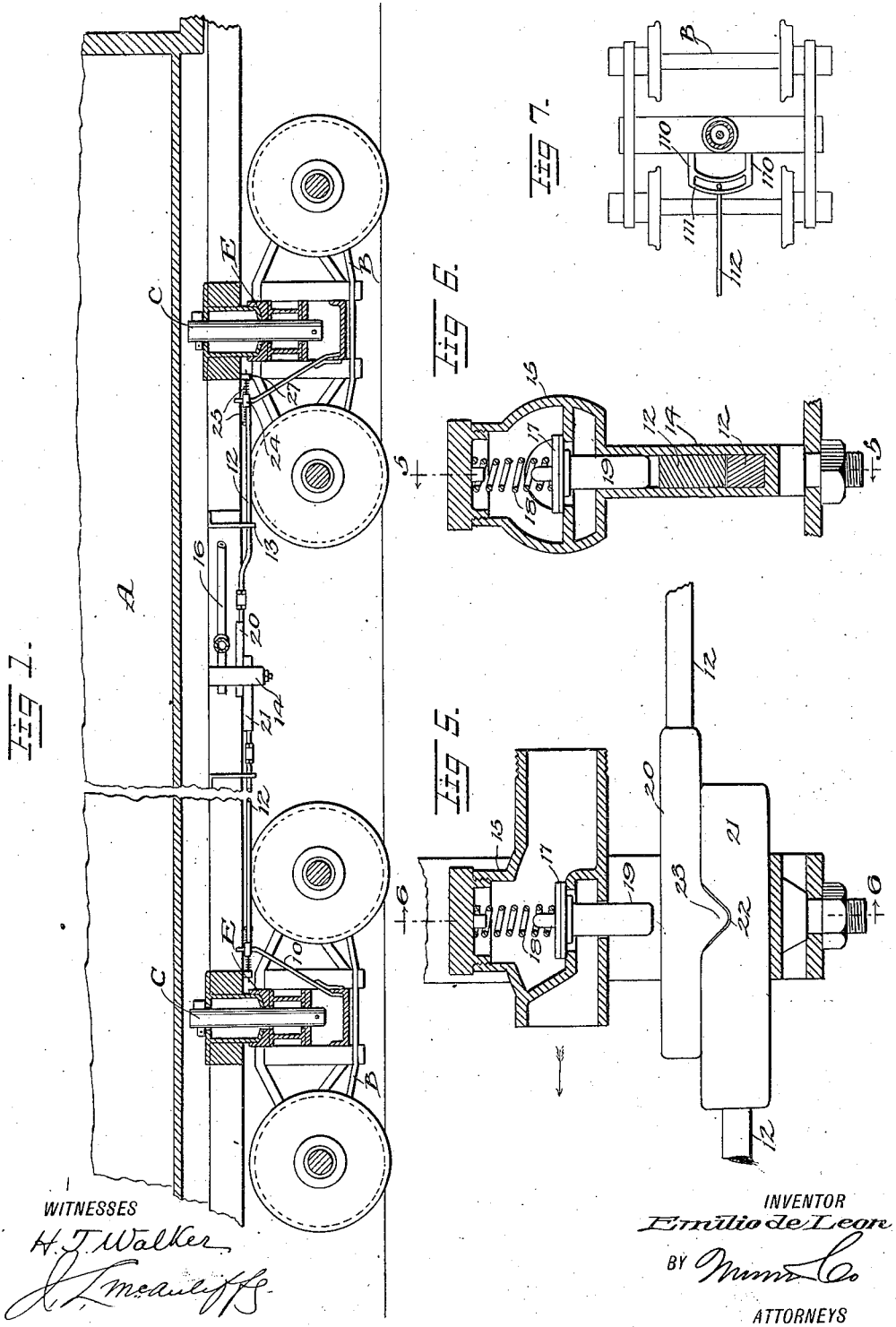
Figure 1 is a longitudinal vertical section through a portion of a car and its trucks together with an automatic train stop in accordance with my invention.

In the illustrated example the letter A indicates a portion of a car; B, a known form of truck; C, the vertical truck pin which in practice permits a swivelling or vertical tilting of the truck relatively to the pin; D indicates track rails; and E indicates a known form of rockable connection between the truck and the parts surrounding the pin C and appurtenant to the car frame.

In carrying out my invention I provide an element 10 rigid with the truck B, it being understood that the invention is applied to one or more of the trucks of a car as may be desired, the preferable embodiment of the invention being associated with two tandem trucks, the vertical tipping of either of which will cause release of the air pressure.

In Figures 1 to 4 the operating element 10 is in the form of an arm in fixed relation to a truck part preferably near the bottom of the truck frame. Said arm 10 extends at its upper end in the form shown in Figures 1 to 4 through a loop 11 on the end of a rod 12, there being an arm 10 and rod 12 for each truck and suitably supported on a fixed part of the car as by hangers 13. The overlapped ends of two rods 12 have support on a hanger or fitting designated generally by the numeral 14 and rigid with the car frame. Said fitting 14 includes a valve body 15 in communication with the rain pipe 16. The valve 17 is normally pressed to its seat by a coil spring 18 and the stem 19 of the valve terminates adjacent the enlarged end 20 of one of the operating rods 12, said end 20 overlapping the enlarged end 21 of the other rod 12. The overlapped ends 20, 21 have respectively a cam projection 23 and a cam recess 22, generally of V-shape, the arrangement being such that a sliding of either rod 12 relatively to the other or the longitudinal movement of both rods simultaneously will cause the projection 23 to ride up the oblique wall of the recess 22, thereby effecting a separating movement of the overlapped ends 20, 21, and causing that end adjacent to the valve stem 19 to engage said valve stem and open the valve 17 against the pressure of the spring 18.

Figure 2:
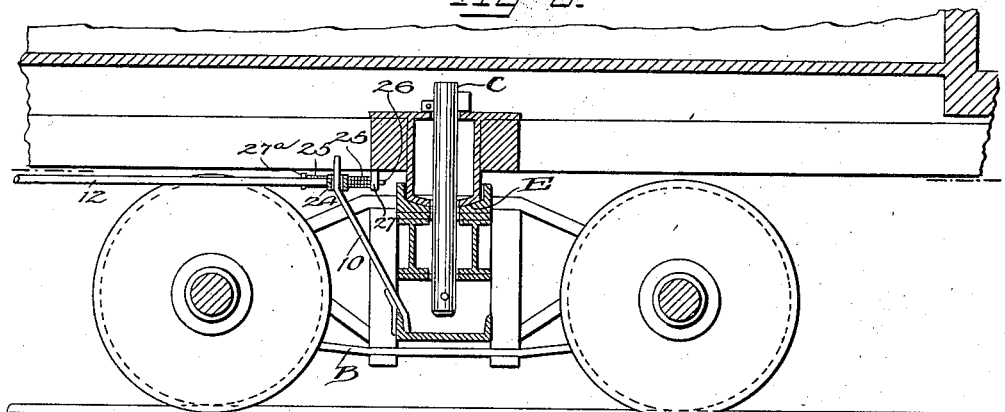
Figure 2 is a longitudinal vertical section of one of the trucks and portions of the car showing the stop operating means in position when the truck is normally travelling on the rails.
Figure 3:
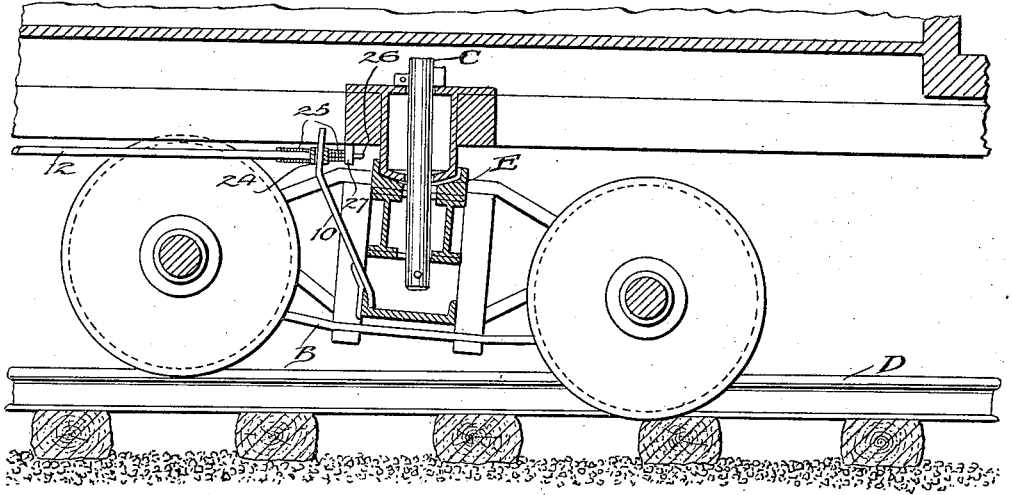
Figure 4:
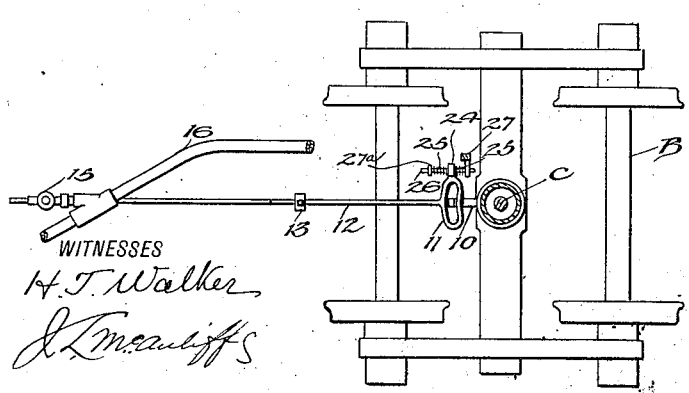
Figure 4 is a diagrammatic plan view of the truck and the stop operating devices, parts being in section.

A pull is exerted on a rod 12 by the arm 10 or its equivalent whenever the truck B drops from the normal position on the track rails as indicated in Figure 2 to the oblique position of Figure 3. The loop 11 affords clearance for the arm 10 when the truck swivels as in going around curves. I may cushion the pulling force exerted on a rod 12 by an arm 10 by providing a lateral lug 24 on the loop 11 and springs 25 at opposite sides of said lug, the lug and springs being movable longitudinally on a guide pin 26 hung on any suitable means on the car frame, said means as shown including a bracket 27 and an eye 27a.

In Figure 7 I show a construction possibly having increased strength over the single operating arm 10. In said Figure 7 two arms 110 rise from the truck and the loop, 111, instead of being formed on the valve operating rod, 112, is formed rigid with the arms 110 and said rod 112 has sliding connection in any suitable manner with one side of the loop 11. The loop, 111, and the sliding connection of the same with the rod 112 permit of the desired amplitude of movement of the arms 110 in response to the swivelling of the truck B in going around a curve and minimize the possibility of complete break-down by an abnormal turning movement of the truck.

By subjecting the valve rod to the tilting action of the truck the arm 10 or arms 110 instantly serve to give longitudinal movement to the rod 12, so that the automatic stop is sensitively responsive to the abnormal dropping of the truck due to the spreading of the rails or to a broken rail or the like.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In an automatic train stop, an element rigid with a truck of the train to partake of turning and tilting movements of the truck, a train pipe valve, and a longitudinally movable valve opening rod, the said element on the truck being turnable with the truck independently of the said rod and arranged to cause a longitudinal movement of the rod upon a tilting of the truck.

2. A train stop including a train pipe valve, valve operating rods mounted for longitudinal movement and overlapping each other, and operating means for said rods, said operating means being constrained to partake of movements of adjacent trucks for giving longitudinal movement to the rods upon abnormal tilting of either truck; together with means integral with the rods to cause a lateral valve opening movement for one of said rods by the relative movement of the rods.

3. In an automatic train stop, a train pipe valve longitudinally movable valve opening rods overlapping adjacent to the valve, said overlapping ends having co-engaging means to cause a separating movement of the rods upon a longitudinal movement thereof to effect opening of the valve, and means to actuate one of said rods upon a dropping of a truck from its normal position on the track rails.

4. A train stop including a train pipe valve, a rod to actuate said valve and provided at one end with an eye, an arm secured to the truck of a train car having one of its ends accommodated within said eye whereby to permit a lateral movement of said arm with respect to the longitudinal axis of said rod, said arm being adapted to move said rod longitudinally upon said truck being displaced from its normal position, and means for cushioning said rod.

5. A train stop including an arm rigidly secured to the truck of a train car, a rod provided with an eye at one end and an ear adjacent said eye provided with a bore, a train pipe valve connected to the opposite end of said rod and actuated thereby, said arm being accommodated in said eye, a bracket supporting said rod by means of said ear and springs at both sides of said ear for cushioning said rod.

6. A train stop including a train pipe valve, a rod for actuating said valve and extending substantially horizontally, means for supporting said rod and permitting the same to have a free and longitudinal movement, said rod at one end presenting an oval eye with the major axis crosswise to the longitudinal axis of the rod, an arm freely inserted in said eye and securedly attached to the truck of a train car, said arm being free to move laterally at both sides of the longitudinal axis of said rod without affecting the rod and adapted to give a longitudinal motion to said rod upon the truck leaving the rail upon which it is supported.

EMILIO DE LEON.